United States Patent
Beatty et al.

(10) Patent No.: US 7,533,112 B2
(45) Date of Patent: May 12, 2009

(54) CONTEXT HIERARCHIES FOR ADDRESS SEARCHING

(75) Inventors: Bryan Kendall Beatty, Sammamish, WA (US); Nikolai Michael Faaland, Sammamish, WA (US); Duncan Murray Lawler, Bothell, WA (US); Elizabeth Jean Wood, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 11/389,765

(22) Filed: Mar. 27, 2006

(65) Prior Publication Data

US 2007/0226187 A1 Sep. 27, 2007

(51) Int. Cl.
*G06F 17/30* (2006.01)

(52) U.S. Cl. .......................................... 707/101; 707/3
(58) Field of Classification Search .................. 707/3, 707/101
See application file for complete search history.

(56) References Cited

U.S. PATENT DOCUMENTS

| | | | | |
|---|---|---|---|---|
| 6,085,188 | A * | 7/2000 | Bachmann et al. | 707/3 |
| 6,732,120 | B1 * | 5/2004 | Du | 707/104.1 |
| 6,738,759 | B1 * | 5/2004 | Wheeler et al. | 707/3 |
| 6,772,139 | B1 * | 8/2004 | Smith, III | 707/3 |
| 6,785,659 | B1 * | 8/2004 | Landsman et al. | 705/14 |
| 6,853,998 | B2 * | 2/2005 | Biebesheimer et al. | 707/101 |
| 6,877,009 | B2 * | 4/2005 | Solomon | 707/100 |
| 6,901,403 | B1 * | 5/2005 | Bata et al. | 707/101 |
| 6,917,938 | B2 * | 7/2005 | Shea et al. | 707/7 |
| 6,922,634 | B2 * | 7/2005 | Odakura et al. | 701/211 |
| 7,007,034 | B1 * | 2/2006 | Hartman et al. | 707/102 |
| 7,353,114 | B1 * | 4/2008 | Rohlf et al. | 702/5 |
| 2002/0049763 | A1 * | 4/2002 | Seamon | 707/100 |
| 2003/0208459 | A1 * | 11/2003 | Shea et al. | 707/1 |
| 2004/0036716 | A1 * | 2/2004 | Jordahl | 345/713 |
| 2005/0086188 | A1 * | 4/2005 | Hillis et al. | 706/50 |
| 2005/0114325 | A1 * | 5/2005 | Liu et al. | 707/3 |
| 2005/0210008 | A1 * | 9/2005 | Tran et al. | 707/3 |
| 2005/0283410 | A1 * | 12/2005 | Gosko | 705/27 |
| 2006/0026124 | A1 * | 2/2006 | Schwarzmann | 707/2 |
| 2006/0053135 | A1 * | 3/2006 | Beaumont et al. | 707/101 |
| 2006/0100889 | A1 * | 5/2006 | Gosko | 705/1 |
| 2007/0067622 | A1 * | 3/2007 | Nakano et al. | 713/163 |
| 2007/0271297 | A1 * | 11/2007 | Jaffe et al. | 707/104.1 |

* cited by examiner

*Primary Examiner*—Don Wong
*Assistant Examiner*—Kim T Nguyen
(74) *Attorney, Agent, or Firm*—Amin, Turocy & Calvin, LLP

(57) ABSTRACT

The subject disclosure pertains to systems and methods for storing and maintaining a large volume of data in a hierarchical data structure. In particular, geographical data can be stored in the hierarchical data structure to facilitate location and retrieval of data. In addition, system and methods for retrieving data from the hierarchical data structure are provided. Search queries can specify both the point of origin of the search and a search method or strategy for navigating the hierarchical data structure. In one aspect, the hierarchical data structure can provide for maintaining sibling relationships.

20 Claims, 15 Drawing Sheets

CONTEXT HIERARCHIES FOR ADDRESS SEARCHING

BACKGROUND

Geographical information such as satellite or aerial photographs, textual data (e.g., directions or descriptions), or any of a variety of types of maps (e.g., road maps, topographical maps, geologic maps, plats and nautical charts) has become increasingly available to information seekers through electronic information sources on the Internet, vehicle navigation systems, handheld devices (e.g., personal digital assistants (PDAs), a smartphone) or any of a variety of other sources. Typically, geographical information can be searched either for a specific address or a particular place or thing, such as a business, an intersection or a named location. In response to a search, information seekers can be presented with a map, photograph or any other information regarding the search location.

The sheer volume of available geographical information is immense. Within the United States of America alone, there are millions of addresses, streets and other geographical objects. Managing and organizing such an enormous volume of data can be a complicated task. In addition, many geographical objects have duplicate names. For example, hundreds of cities and towns include a Main Street and many cities have identical names (e.g., Cadiz, Ohio in the United States and Cadiz, Spain). To be useful, devices that provide geographical information to users need to quickly search a vast volume of geographical data and retrieve the relevant geographical information.

One approach to managing a large volume of data, such as geographical data, includes utilizing a hierarchical data structure. A hierarchical data structure can facilitate differentiating among data objects with identical names. In addition, utilizing a hierarchical arrangement can reduce the necessary scope of a search. Limiting a search to a division within the hierarchical data structure can minimize the amount of data that needs to be searched to retrieve relevant information.

Unfortunately, restriction of searches to divisions within a hierarchical structure can reduce the likelihood that the relevant information will be located during a search of the data structure. For example, if the wrong portion of the hierarchical data structure is searched, the relevant data may not be found, even when the data is present within the data structure and would be found if the entire structure were searched. Subdividing and managing volumes of data using a hierarchical data structure can increase the search speed of the data structure; however, it can also reduce the accuracy and usefulness of the search results.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns storing and maintaining large volumes of data in a hierarchical data structure and efficiently retrieving information from the data structure. Relevant information can be selected from one or more data sources for inclusion in the data structure. Systems and methods are provided for optimizing the data structure based upon user requirements. Data can be organized within the data structure such that user knowledge can be used to minimize the scope of the search and therefore the time and processing power required to complete the search. At the same time, the data can be organized within the data structure to increase robustness of searches, ensuring the desired data is retrieved.

In one aspect, a large volume of data is stored in a hierarchical structure (e.g., a tree), where each node of the structure represents a context. This hierarchical structure of contexts is referred to herein as a context hierarchy. Each context can include any number of data objects as well as any number of child nodes, where each child node represents a context. Data can be selected for inclusion in the context hierarchy from a set of input data. Certain data objects can be duplicated in multiple contexts to increase the likelihood that relevant data will be retrieved for a search query. By including data objects in multiple contexts, the probability that the object will be found during a search is increased, even if the user unsure or mistaken in the exact context of the data object. In addition, non-hierarchical relationships (e.g., sibling relationships) can be identified based upon the input data. Sibling relationships, as used herein, indicate an additional relationship (e.g., physical proximity) beyond simply sharing a parent context. The sibling relationship can indicate that sibling contexts of the selected context are likely to have relevant information for a search query.

In another aspect, systems and methods are provided for navigating the context hierarchy during a search of the context hierarchy. A search query can include terms used to search contexts and a context filter. The context filter can specify both a start context and a navigation strategy. The start context denotes the context at which a search of the context hierarchy will originate. The navigation strategy indicates the method or strategy for navigating the context hierarchy. Possible navigation strategies include searching only the start context, ascending the context hierarchy, descending the context hierarchy and navigating to and searching sibling contexts of the start context.

In a further aspect, a context hierarchy can be used to manage a large volume of geographical data. The context hierarchy can be based upon spatial relationships, where a context physically encompasses any child contexts and named objects. Sibling relationships can be determined by physical proximity of contexts, such as neighboring towns.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
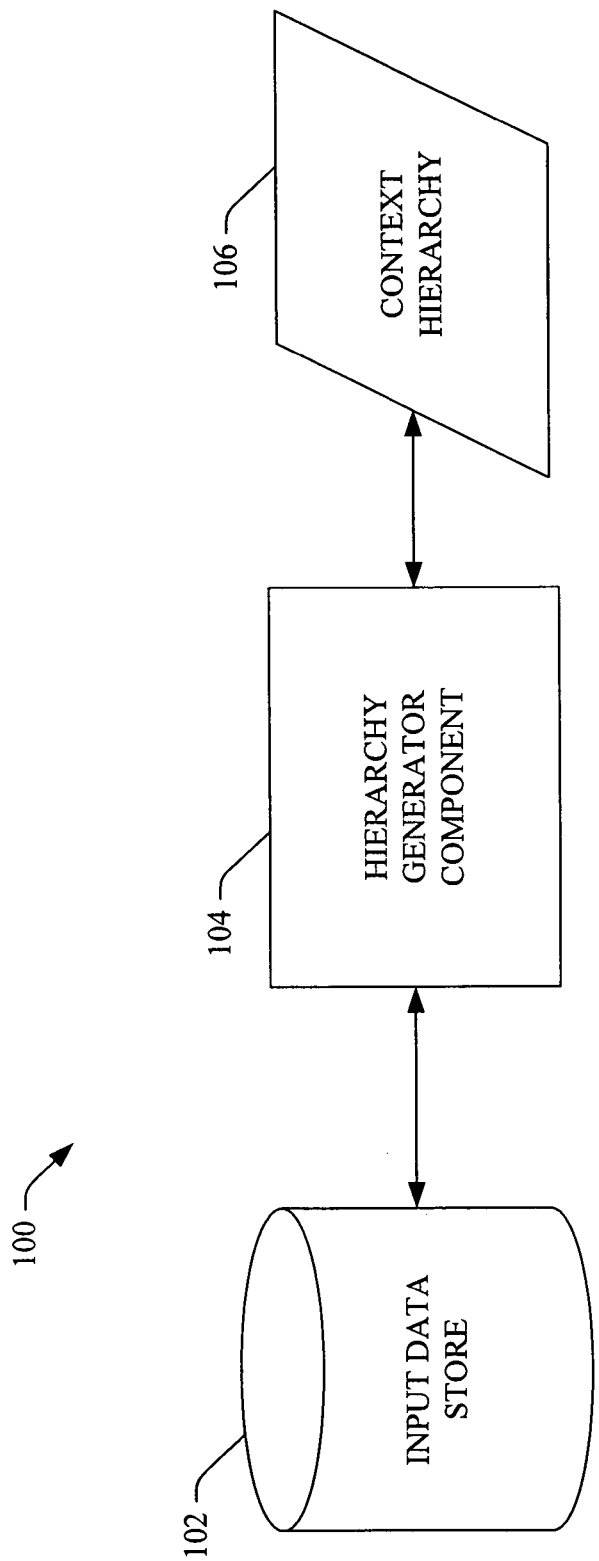
FIG. 1 is a block diagram of a system for generating a context hierarchy set in accordance with an aspect of the subject matter disclosed herein.

The various aspects of the subject matter described herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

One approach to maintaining large volumes of data is to utilize a hierarchical data structure. For example, geographical objects can be managed using a hierarchical data structure. As used herein, a geographical object includes any geographical locations or features such as geographical divisions, including, but not limited to addresses, streets, parks, cities, states, counties, districts and countries, as well as physical features including, but not limited to, lakes, rivers, mountains and continents. Geographical objects tend to have an explicit or implicit hierarchy based upon physical location and boundaries. For example, the United States includes fifty states, each state includes a number of counties and each county can include a number of cities. Data objects, such as geographical objects, can be represented using a hierarchy of contexts (e.g., a tree) referred to herein as a context hierarchy. A context, as used herein, defines an object's relationship to other objects within the data set. In the geographical examples discussed herein, contexts represent the physical relationships between the geographical objects. For example, the context of a street can be the city in which the street is located and the context of the city can be the state in which the city is located.

When a context hierarchy is utilized, user knowledge can be used to limit the scope of a search. Users may be able to provide information to limit a search to a specific context or set of contexts. For example, if a user is interested in information related to Bob's Pizza and knows that the restaurant is located in the Redmond, Wash., a search for Bob's Pizza can be limited to the context of Redmond. Taking advantage of this user knowledge can reduce the scope of the search from the entire volume of geographical objects to geographical objects specific to the city of Redmond, possibly reducing the search data set from millions to thousands of records. Reducing the scope of the search can increase the speed of the search and/or reduce the processing power necessary to complete the search in a reasonable period of time. Reducing the scope of the search can also increase the usefulness of the results, by eliminating irrelevant matches from other contexts (for example, searching for Bob's Pizza within Redmond won't include Bob's Pizza locations in Florida, Hawaii, etc.)

Referring now to FIG. 1, a system 100 for organizing and managing a large volume of data to facilitate user searches in accordance with an aspect is illustrated. The system 100 utilizes data (e.g., geographical data) from one or more data stores 102. A single data store 102 is illustrated here for simplicity; however, multiple data stores can be utilized. A data store, as used herein, is any collection of data including, but not limited too, a database or collection of files, including text files, web pages, image files, audio data, video data, word processing files and the like. Data within the input data store 102 can be formatted in any manner.

The system includes a hierarchy generator component 104 that obtains data from the data store 102 and generates a context hierarchy 106 or updates an existing context hierarchy. The hierarchy generator component 104 can select a subset of the data from the data store 102 for inclusion in the context hierarchy 106. In addition, the hierarchy generator component 104 can analyze data from the data store 102 to determine additional, non-hierarchical data relationships and represent those additional relationships in the context hierarchy 106. The context hierarchy 106 can be structured to facilitate user searches. The context hierarchy 106 can be structured based on locale specific requirements, software application requirements, user needs or any other useful set of requirements.

Figure 2:
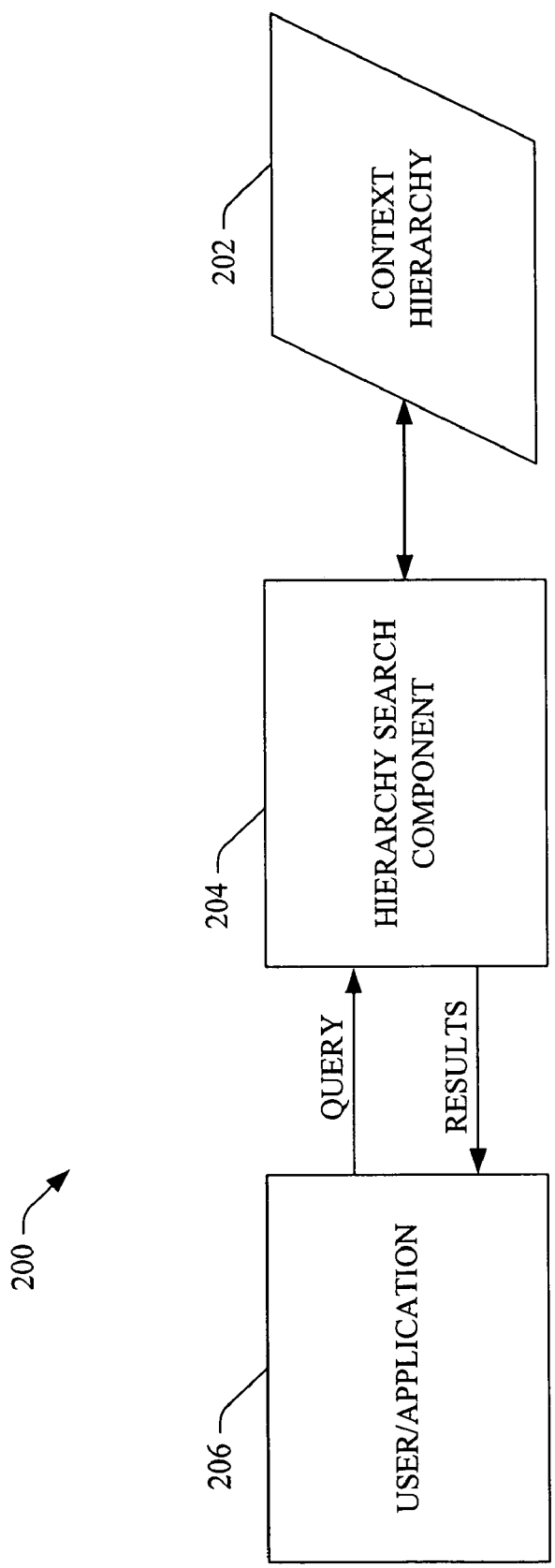
FIG. 2 is a block diagram of a system for searching a context hierarchy in accordance with an aspect of the subject matter disclosed herein.

Referring now to FIG. 2, a system 200 for searching a context hierarchy 202 is illustrated. The context hierarchy 202 can include the context hierarchy 106 generated or updated by the system illustrated in FIG. 1. Alternatively, the context hierarchy 202 can include one or more subsets of context hierarchy 106. For example, context hierarchy 106 generated in FIG. 1 could include a context for the entire world. Context hierarchy 202 can be composed of a subset of context hierarchy 106 including just those geographical objects contained within the context of the state of Washington. Because of the modular, hierarchical structure, the context hierarchy can be subdivided into portions that can be separately managed and searched. This allows subsets of the context hierarchy to be separately loaded onto devices and searched. For example, the context for the state of Washington can be loaded onto a handheld device, such as a smartphone.

System 200 can include a hierarchy search component 204 that is able to accept a query from an application or user 206 and search the context hierarchy 202 for relevant information based upon the query. The search results can be returned to the application or user 206 or displayed using a user interface (not shown). The user interface can display the search results in any format useful to or desired by the users.

Figure 3:
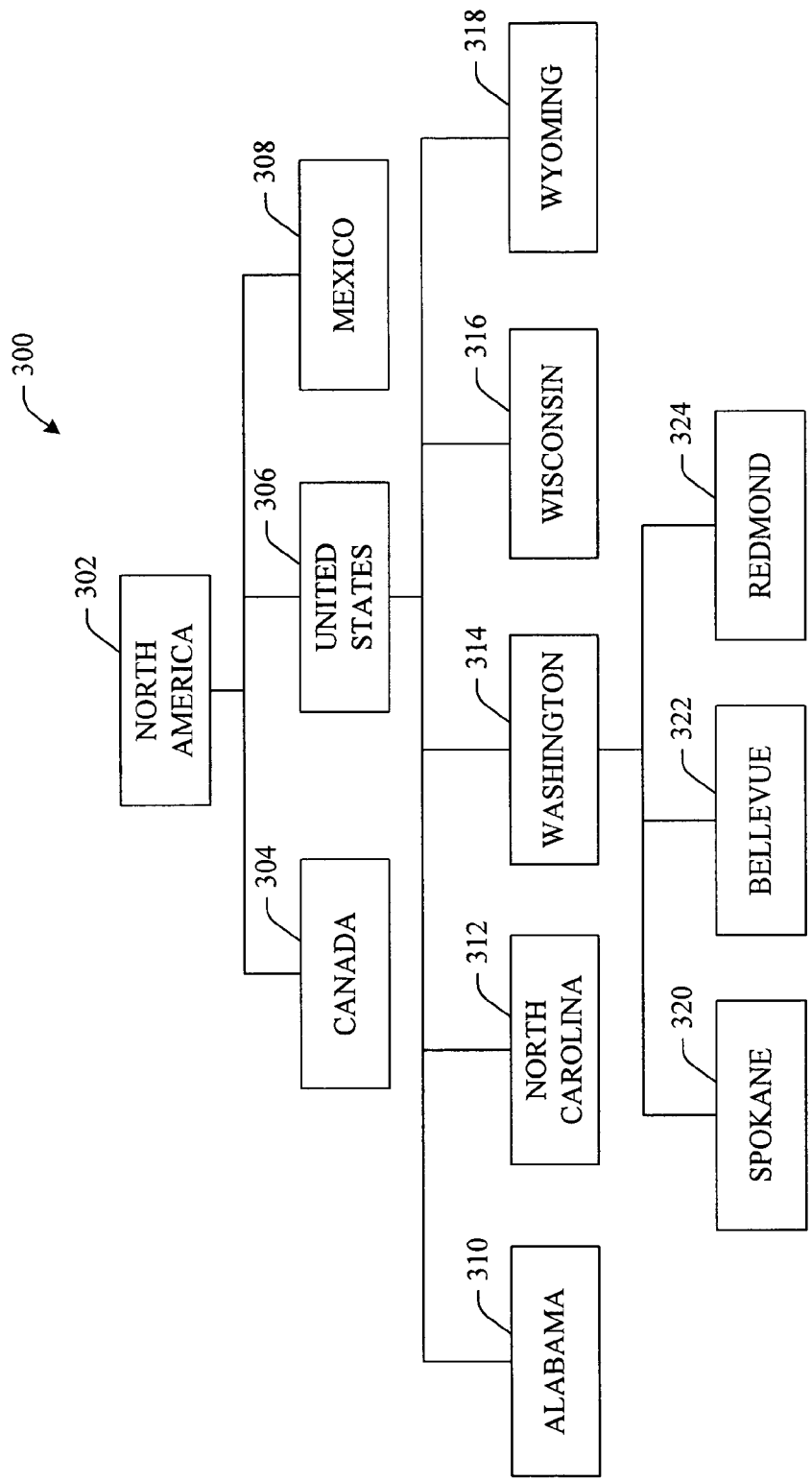
FIG. 3 illustrates an exemplary context hierarchy in accordance with an aspect of the subject matter disclosed herein.

Referring now to FIG. 3, an exemplary context hierarchy 300 storing geographical data is illustrated. Here, each node of the tree can represent a context that represents a geographical object. Each context can include other contexts, represented as child nodes within the tree 300. The tree 300 can be a subset of a larger tree or context hierarchy. The root node 302 of the tree 300 represents the context of North America. Included within the context of the North America 302 are child nodes representing North American countries: Canada 304, the United States of America 306 and Mexico 308. For simplicity, many of the child nodes of tree 300 are omitted. For example, Canada 304 includes provinces (e.g., Alberta, Quebec, etc.) that are not shown in FIG. 3. The United States context 306 includes child nodes including states Alabama 310, North Carolina 312, Washington 314, Wisconsin 316 and Wyoming 318. Additional child nodes could include, but are not limited to, the remaining states and commonwealths. Each state context can include one or more child nodes representing cities located within that state. For example, Washington 314 has child nodes representing the cities of Spokane 320, Redmond 322 and Bellevue 324.

For each context or node, such as the root node North America 302, the tree can include a data set that includes all of the named objects included within that context. The context can include any named object that is completely encompassed by the context and that is not contained within a child node of the context. For example, in tree 300 the node representing the United States context 306 can include the fifty states, interstate highways, mountain ranges (e.g., Blue Ridge Mountain Range), rivers (e.g., Ohio River), lakes and any other geographical object located entirely within the boundaries of the United States. For example, the Blue Ridge Mountain Range is included in the context of the United States rather than in individual states because the mountain range extends through multiple states (e.g., South Carolina, North Carolina, New York, etc.). However, Grandfather Mountain would be included in the context of North Carolina 312 rather than the United States context 306 because it is contained entirely within North Carolina 312. Consequently, Grandfather Mountain can be included in the data set associated with the node representing North Carolina 312, but the Blue Ridge Mountain Range would not be included.

The state contexts, as illustrated in FIG. 3, can also include child contexts representing cities. For example, the child node representing Washington 314 can include one or more child nodes representing cities such as Spokane 320, Bellevue 322 and Redmond 324 in the state of Washington 306. Each city node can include a data set of addresses, businesses or any other named object contained within the city limits.

The tree structure illustrated in FIG. 3 is merely exemplary. Many different levels of parent and child nodes can be used to manage the data. In addition, the structure can vary for separate divisions or branches of the of the context hierarchy. For example, the structure can vary based upon locale, such as country. In the United States addresses are generally denoted by street, city, state and country, if necessary. Therefore, the context hierarchy for the United States can include levels representing cities and states to facilitate searching by address. However, Canadian addresses are denoted by street, city, province and country, if necessary. Consequently, the context hierarchy for Canada can include cities and provinces, rather than states. In another example, Germany denotes addresses using only the street, city and country. Accordingly, the context hierarchy for Germany can include city contexts directly below the context representing the country of Germany. Context hierarchies can be adapted to include only the data and relationships likely to be relevant to a user.

Figure 4:
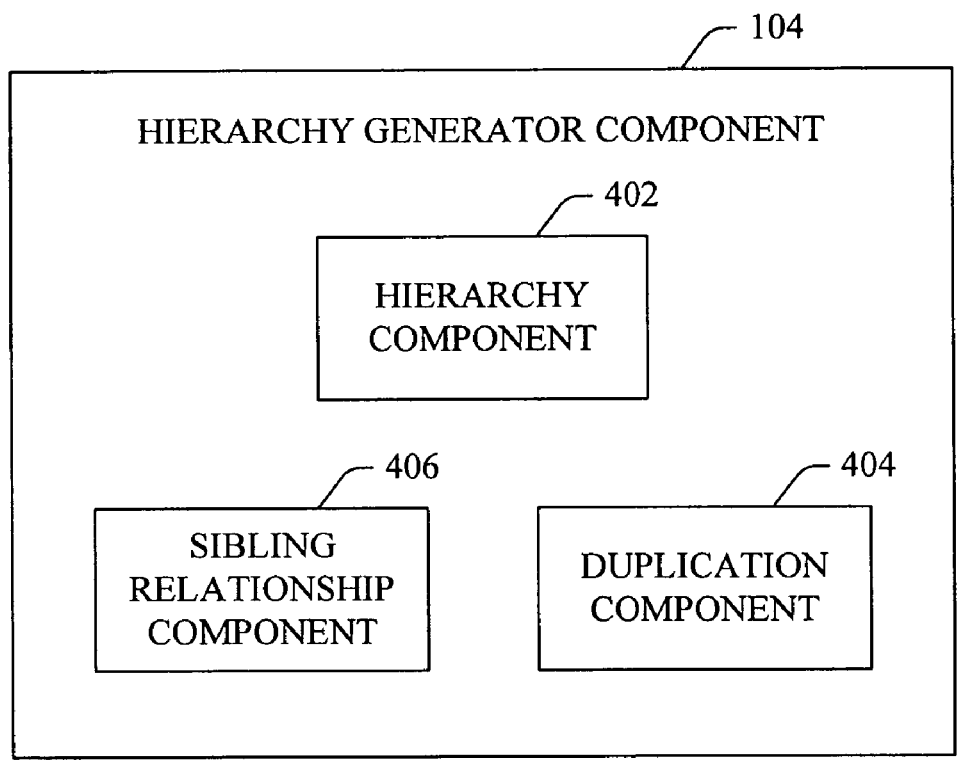
FIG. 4 illustrates a system for generating a context hierarchy in accordance with an aspect of the subject matter disclosed herein.

Referring now to FIG. 4, a hierarchy generator component 104 for generating a context hierarchy is illustrated. The hierarchy generator component 104 can include a hierarchy component 402 that selects data from an input data store for inclusion in the context hierarchy. Frequently, input data stores include information that is irrelevant to users and consequently need not be included in the context hierarchy. For example, the irrelevant data can include geographical information including the counties located within each state. Within the input data store, each city can be located within the context of a county and each county located within the context of a state. However, counties are not typically used in addresses in the United States. To optimize the context and allow users to retrieve location information by address, county information is unnecessary. Therefore, the hierarchy component 402 can eliminate the county contexts and place cities directly within state contexts. For example, in the input data store the city of Seattle can be contained within the King County context, which in turn is contained within the state of Washington context. The hierarchy component 402 can remove the county context and place the city of Seattle directly within the state of Washington context.

The hierarchy component 402 can include information regarding the data relationships for one or more portions of the context hierarchy. For example, the hierarchy component 402 can include information regarding the hierarchy and data used to specify addresses for the United States (e.g., street, city, state and country) as well as the hierarchy and data used to specify the addresses in Germany (e.g., street, city and country). Alternatively, hierarchy and data information can be imported when data is obtained from the data store.

In addition, the hierarchy generator component 104 can include a duplication component 404. The duplication component 404 duplicates or copies named objects in multiple contexts within the context hierarchy to assist users in retrieving information. The hierarchical structure of the context hierarchy increases the speed of searches by generally reducing the scope of searches. However, this reduction in search scope can result in a failure to retrieve relevant information. For example, Bob's Pizza could be located on a street that marks the boundaries between two cities, Redmond and Bellevue. A user desiring data related to Bob's Pizza might mistakenly believe that Bob's Pizza is located in the city of Bellevue, when in fact Bob's Pizza is located in Redmond. If a search were performed solely in the context of the city of Bellevue, the data related to Bob's Pizza would not be retrieved. To mitigate this problem, the duplication component 404 can duplicate the named object for Bob's Pizza and include the named object for Bob's Pizza within the Bellevue context as well as the Redmond context. This duplication can increase the overall size of the context hierarchy, however duplication can also prevent user frustration, increasing search robustness of the context hierarchy. Duplication can be limited to situations where named objects are on the boundaries between contexts to avoid adding excessive duplicative data to the context hierarchy. Alternatively, the data can be stored in a single location and a pointer indicating the location of the data can be included in one or more of the contexts that reference the data.

The hierarchy generator component 104 can also include a relationship component 406. The relationship component 406 identifies relationships between contexts and indicates the sibling relationship within the context hierarchy. As used herein, the term sibling node denotes that nodes have a relationship beyond that of sharing a parent. In fact, it is not necessary that the nodes share a direct parent in order to have a sibling relationship. In particular, physical proximity can be used to determine a sibling relationship (e.g., adjacent cities can be marked as sibling nodes). For example, Redmond and Bellevue can be denoted as sibling nodes because of their proximity. However, Redmond and Spokane would not be likely to be denoted as sibling nodes because Redmond is located in western Washington while Spokane is located several hundred miles away in eastern Washington. Although Redmond and Spokane share the same parent node, they do not have the relationship required to be sibling nodes, in this case spatial proximity. Finally, Jersey City and New York City can be denoted as siblings because of their physical proximity, despite the fact that their direct parents are New Jersey and New York State, respectively.

Connections or correlations between contexts, used to establish a sibling relationship between nodes, can be determined based upon the information in the data store. For example, if a sibling relationship is based upon spatial proximity, location data (e.g., latitude and longitude) can be used to establish proximity, even though this location data may not be included in the context hierarchy. The relationship component 406 can perform geometric analysis of the location data to determine proximity of contexts and establish sibling relationships. Sibling relationships can be used during a search of the context hierarchy as described in detail below.

Once the appropriate context hierarchy has been generated or updated, the context hierarchy can be searched to locate the relevant named object or objects. In an aspect, a large volume of data can be managed using a context hierarchy. The context hierarchy can then be downloaded or ported to various devices for use by a variety of software applications. Alternatively, one or more portions of the context hierarchy can be downloaded to devices. Due to the modular nature of the context hierarchy, selected portions of context hierarchy can be loaded into devices and separately searched. For example, a user with a handheld device (which has limited memory) who resides in the greater Seattle area, may elect to download geographical information for Seattle and the surrounding cities, but not geographical information for Spokane, which is located several hundred miles to the east of Seattle. The structure of the context hierarchy allows for portions of the context hierarchy, to be used separately. In this example, a context hierarchy can be created and then distributed, such that separate applications or users can access and utilize the data. Alternatively, given sufficient processing power and memory, the context hierarchy can be continually updated or modified and available for searching.

Figure 5:
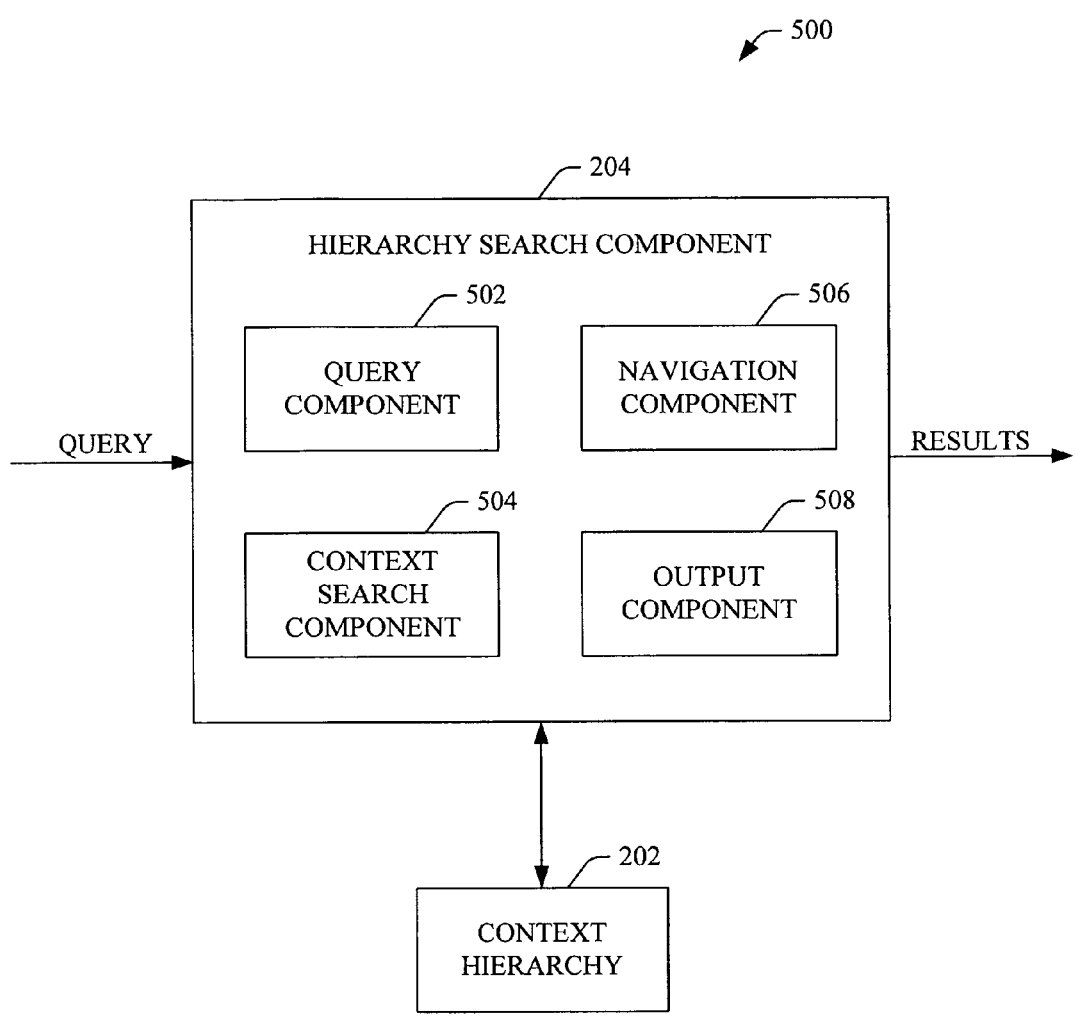
FIG. 5 illustrates a system for searching a context hierarchy in accordance with an aspect of the subject matter disclosed herein.

Referring now to FIG. 5, a system 500 for searching a context hierarchy is illustrated. The system 500 includes a hierarchy search component 204. The hierarchy search component 204 includes a query component 502 that receives a search query. The search query can include the search criteria or terms and a context filter. The context filter can specify the context that serves as the origin for the search of the context hierarchy, referred to herein as the start context. In addition, the context filter can include the method or strategy for navigating the context hierarchy during a search. The navigation strategy can provide for a search of only the start context, an ascending search of the context hierarchy beginning at the start context, a descending search of the context hierarchy beginning at the start context and a search of sibling contexts of the start context.

A search query can be generated by a user via a user interface. A user interface can be a separate application, such as a map generator, direction generator or any other application that utilizes the data stored in the context hierarchy. The user interface can control the navigation strategy used to search the context hierarchy. For example, for a handheld device with limited memory and/or processing power, the user interface may automatically select a navigation strategy that searches only within a single, specified context or within a limited set of sibling contexts. Because of the limitations of the device, a handheld device may not provide users with the options for ascending or descending searches. Alternatively, the user interface can allow users to specify or select a search strategy. In addition, an application can independently generate a search query.

The hierarchy search component 204 can include a context search component 504 that can search the data set of named objects for a specific context based upon the search query. A query can be a text string or any other input used to select one or more named objects. Named objects can be selected based upon their name, characteristics or various metadata associated with the named object. The context search component 504 can be used to retrieve any named objects within a given context that match the criteria of the query.

The hierarchy search component 204 can also include a navigation component 506. The navigation component 506 can utilize the navigation strategy specified by the search query to navigate or move through the context hierarchy 202. As the navigation component 506 moves through the context hierarchy, the context search component 504 can search the contexts for a named object or objects that match the search criteria specified in the search query. If the navigation strategy specifies that a single context is to be searched, only the start context specified within the search query will be searched.

However, if the search query specifies ascending, descending or sibling navigation strategies the navigation component can navigate through the context hierarchy beginning at the start context specified in the search query.

If an ascending navigation strategy is specified, the navigation component 506 will move upward through the search hierarchy such that each ancestor context is searched based upon the specified search criteria. When an ascending navigation strategy is specified, the navigation component 506 begins at the start context. The start context can be searched by the context search component 504. Next, the navigation component 506 moves to the parent, if any, of the start context and the parent context can be searched. After the parent context of the start context is searched, the navigation component 506 can navigate to the parent, if any, of the parent context. The navigation component 506 can continue to ascend through the context hierarchy until the root node is reached or until search termination conditions are met.

Termination conditions can be determined based upon the search query or the context hierarchy can include predetermined conditions for termination of a search of the context hierarchy. The navigation component 506 can continue to navigate through the context hierarchy until all possible contexts have been searched based upon the selected navigation strategy or until the termination conditions are met. For example, the termination conditions can specify a maximum number of matches to be located. Alternatively, the termination conditions can specify a maximum period of time for searching the context hierarchy. In addition, the termination conditions can specify that if an exact match, or even a match meeting or exceeding certain standards, is located the search will terminate.

The ascending navigation strategy can be particularly useful when a user knows where part of a named object is located, but is uncertain of the context that completely encompasses the named object. For example, a user might be aware that a river runs through a first town, but be unaware that the river runs through several additional towns. A search for the river in only the first town's context would not retrieve the desired data. However, the parent context of the first town might encompass the river. For example, a user desires information regarding the Columbia River. Although, the user is aware that the Columbia River runs through the State of Washington, they may not be aware that the Columbia River is not only not enclosed by the state of Washington, the river is not completely encompassed by the United States. A portion of the Columbia River is located in Canada. Consequently, in the exemplary context hierarchy illustrated in FIG. 3, the proper context for the Columbia River is North America. If a search for the Columbia River were limited to the Washington context, no results would be found, which could confuse a user, particularly if the user was aware that the Columbia River runs through Washington state. However, if the search query specifies Washington as the start context and an ascending navigation strategy, the navigation component 506 would begin at Washington context, navigating next to the United States context and finally the North America context, thereby locating the Columbia River. It is important to note that during this particular ascending navigation strategy, the navigation component 506 does not move to a child node of a context. For example, in the Columbia River search described above, the navigation component 506 does not navigate to children of the start context (e.g., Spokane and Redmond) or children of the parent of the specified context (e.g., West Virginia or Wisconsin).

Alternatively, the search query can specify a descending navigation strategy. For a descending navigation strategy, the navigation component 506 can move downward through the children of the start context. The navigation component 506 can utilize a recursive search strategy to implement a descending navigation for searching a context hierarchy such as a tree. Descending navigation strategies can be particularly useful when a user does not know the specific context in which the named object is located, but does know a context that completely encompasses the named object. For example, a user may not know whether Bob's Pizza is contained in the context representing the city of Bellevue or the context for the city of Redmond, but the user can be sure that Bob's Pizza is located within the state of Washington. If the search query specifies a descending navigation strategy with Washington designated as the start context, Bob's Pizza would likely be retrieved. For this example, the navigation component 506 can begin at the start context representing the state of Washington. The Washington context can be searched by the search component 504. Next, the navigation component can move to a child node of the Washington context, such as Spokane. The Spokane context can then be searched using the search component 504. The navigation component 506 can continue to navigate to each of the descendants of the Spokane context, such that each descendant of the Spokane context is searched. After all of the descendants of the Spokane context are searched, the navigation component 506 can navigate to another child of the Washington component, such as Seattle. The search can continue until all descendants of the Washington context have been searched. Searching using a descending navigation strategy can be relatively costly or time-consuming. However, a search using a descending navigation structure may be more likely to find the desired named objects than other more efficient navigation strategies.

Alternatively, the search query can specify a sibling navigation strategy. During sibling navigation the start context and each sibling context of the start context is searched. The navigation component 506 can begin at the start context and navigate to each context designated as a sibling of the start context. Sibling relationships can be determined based on an additional relationship between contexts not reflected in the hierarchical parent-child relationships, such as spatial proximity of contexts. For example, Redmond and Bellevue are relatively close to each other and therefore can be considered sibling contexts. However, Spokane is several hundred miles from either Redmond or Bellevue. Although Redmond, Bellevue and Spokane all share the same parent context, Washington state, it is unlikely that Spokane would be considered a sibling of either Redmond or Bellevue. Additionally, the cities of Jersey City and New York may be considered sibling contexts because of their spatial proximity despite not sharing the same parent context.

The context hierarchy can denote sibling relationships by associating a list of sibling contexts with each context. For example, the node that represents the Redmond context can include a list of sibling contexts (e.g., Bellevue). Alternatively, sibling context information can be maintained separately from the context nodes. The navigation component 506 can utilize the list of sibling contexts to move through the context hierarchy. For example, if Redmond is specified as the start context, the navigation component 506 can begin at the Redmond context. The search component 504 can search the Redmond context based upon the search criteria. The navigation component 506 can then retrieve the list of sibling contexts of Redmond, if any, and navigate to the first sibling context, Bellevue. The navigation component 506 can continue to navigate through the list of sibling contexts of the start context.

The sibling navigation strategy can be particularly useful when a user knows a context proximate to the context named object, but either is not sure of the exact context or is in fact mistaken regarding the specific context in which the named object is located. For example, a user may believe that Bob's Pizza is in Redmond. However, the user may be mistaken regarding the exact location of the Redmond city limits and Bob's Pizza may actually be located in Bellevue. If a sibling navigation strategy is used with Redmond as the start context, Bob's Pizza will be located if Bellevue is a sibling context of Redmond. While Bob's Pizza can also be located using a descending navigation strategy where the state of Washington is specified as the start context, the search using the sibling navigation strategy is much narrower in scope and therefore likely to be faster than a search using a descending strategy. If the sibling navigation strategy is used a handful of cities proximate to Redmond can be searched, while cities located on the far side of the state, such as Spokane, can be ignored.

The system 500 can also include an output component 508. The output component 508 can prepare the results of the search and return the search results to a user, user interface or other application. The output component 508 can format the results in any manner suitable for use by a user, user interface or other application. In addition, the output component 508 can sort, rank or filter the returned search results. For example, the output component 508 can limit the number of results output. The output component 508 can sort or rank the search results and return a subset of the results. Results can be ranked, sorted or filtered based upon how well the result matches search terms of the input query, alphabetical order, the context in which the result was found or in any other manner useful the recipient. In addition, the search query can include output information regarding the desired format or limitations on the search results. This output information can be used by the output component 508, determine the results.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flowcharts of FIGS. 6-13. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 6:
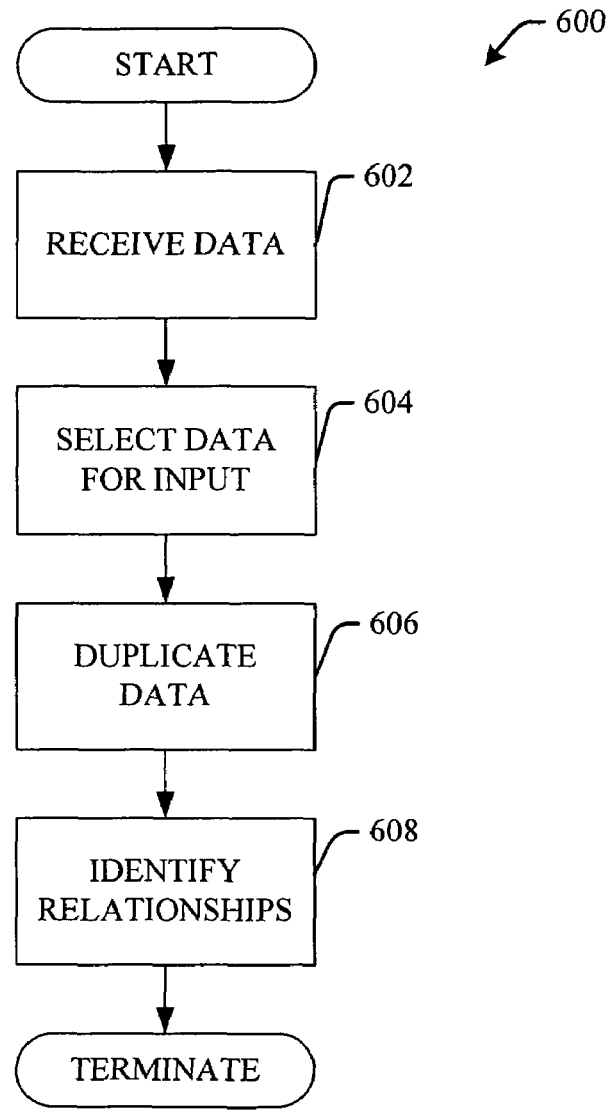
FIG. 6 illustrates a method for generating a context hierarchy in accordance with an aspect of the subject matter disclosed herein.

Referring now to FIG. 6, a methodology 600 for generating a context hierarchy is illustrated. At 602, data can be received from one or more sources in one or more formats. For example, geographical data can be collected and stored in multiple formats by one or more vendors. Geographic data for Germany can be collected by a first vendor using one format, while data for Japan can be collected by a separate vendor utilizing a different format. In addition, the type of data collected as well as the data relationships can vary from vendor to vendor and region to region.

A subset of data can be selected from the received data for inclusion in the context hierarchy at 604. The context hierarchy may require only a portion of the available data. For example, if the context hierarchy is intended to support mapping applications for use by the general public, certain information such as latitude, longitude and elevation may be unnecessary. To optimize search speed and therefore utility of the context hierarchy, some of the data available from the data sources need not be included in the context hierarchy.

At 606, certain data objects from the received data can be duplicated and included at multiple positions in the context hierarchy to increase the likelihood that relevant data is retrieved during a search of the context hierarchy. In particular, data near the boundaries of a context and proximate to a nearby or adjacent context can be duplicated or entered in both contexts. Although duplication of the data objects can require additional storage, entry of data in multiple contexts under limited conditions can help ensure that relevant data is retrieved and reduce user frustration.

Additional relationships between contexts and named objects can be identified at 608. In general, context hierarchies provide for parent child relationships between contexts. However, a context hierarchy can also provide for an additional relationship between contexts, such as a sibling relationship. As described in detail above, the sibling relationship is an additional link between contexts. For example, in a context hierarchy representing geographical relationships, sibling relationships can be based upon physical proximity. A predetermined threshold (e.g. 30 miles) can be used to determine whether a context is considered proximate and identify a sibling relationship between contexts. Alternatively, proximity can be determined based upon adjacency of contexts, such as a shared border or city limit. Each node or context within a context hierarchy can include a list of sibling nodes. Alternatively, sibling relationships can be separately maintained.

Sibling relationships can be established and maintained at one or more levels of the context hierarchy. For example, the context hierarchy could maintain sibling relationships only for city level contexts. Alternatively, sibling relationships can be maintained for adjacent states as well as proximate cities. In addition, separate criteria can be used to determine sibling relationships at different levels of the context hierarchy. A sibling relationship at the city level can be determined based upon the distance from the city limit of a first city to that of a second city. In the same context hierarchy, sibling relationships for a state context can be determined based upon whether the states share a border.

Figure 7:
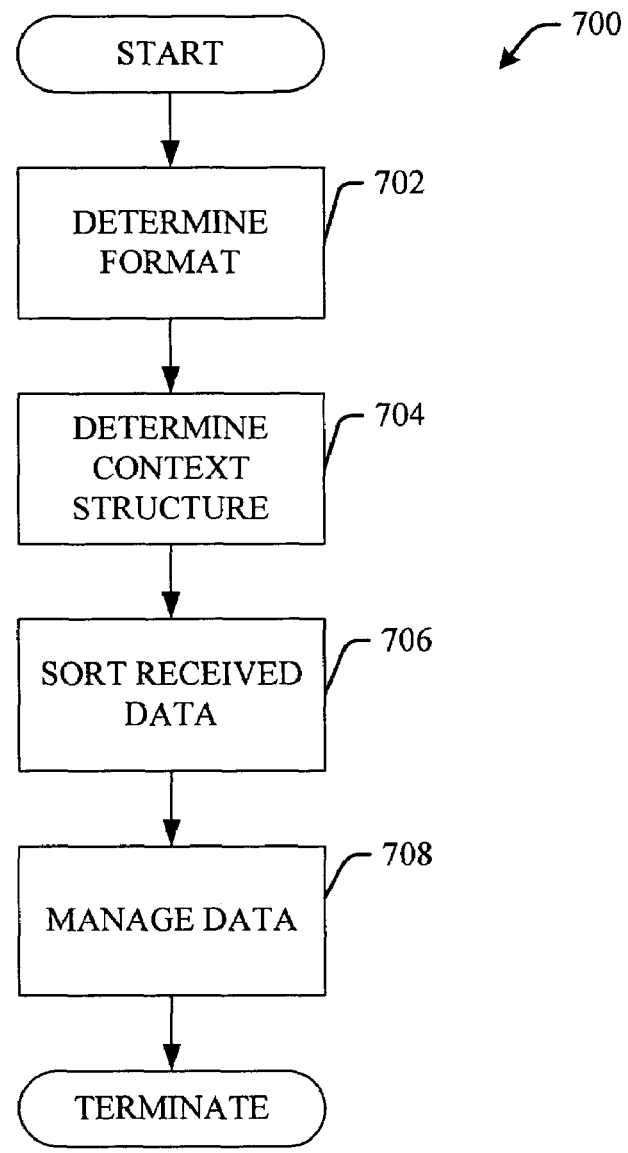
FIG. 7 illustrates a method for selecting data from one or more data sets for inclusion in a context hierarchy in accordance with an aspect of the subject matter disclosed herein.

Referring now to FIG. 7, a methodology 700 for selecting data from one or more received data sets for inclusion in a context hierarchy is illustrated. At 702, the format of the data set is determined. The format can be specified at the time the data set is processed. Alternatively, format information can be separately maintained. At 704, a set of rules or requirements for selecting and maintaining the data in the context hierarchy is determined. Certain data and data relationships may not be selected for inclusion in the context hierarchy based upon user needs or requirements. For example, as discussed above, counties are not typically used in addresses in the United States. Once the requirements for the context hierarchy are determined, the received data can be sorted and organized according to the structure of the context hierarchy at 706. At 708, the sorted data is stored or maintained in the context hierarchy.

Figure 8:
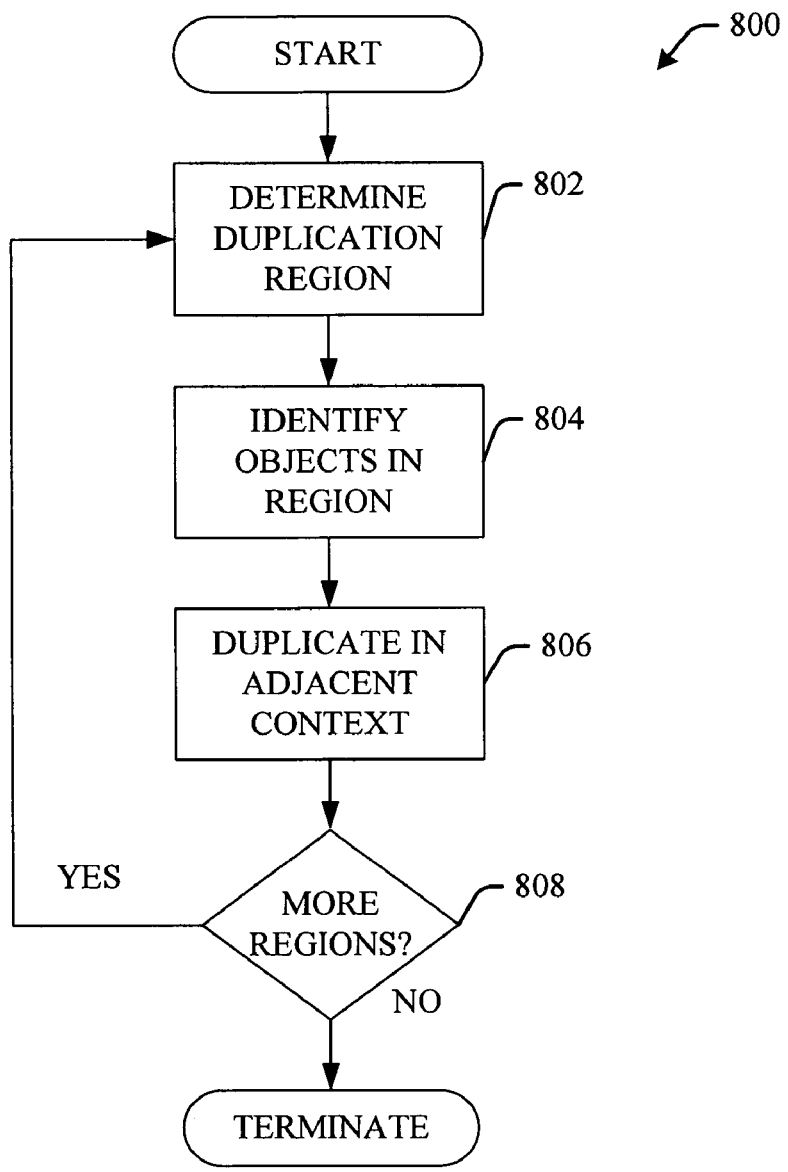
FIG. 8 illustrates a method for duplicating data for insertion in multiple contexts in accordance with an aspect of the subject matter disclosed herein.

Referring now to FIG. 8, a methodology 800 for duplicating named objects for insertion in multiple contexts is illustrated. At 802, a duplication region for a context is determined. The duplication region can be based upon proximity (e.g., physical proximity) between two contexts. For example, the boundary dividing two adjacent cities may run along a street, such that one side of the street is within the city limits of the first city, while the other side of the street lies within the city limits of the second city. To assist users in retrieving named objects located on the boundary street, the named objects (e.g., addresses and businesses) located within the duplication region can be duplicated and/or included in the contexts for both cities. Alternatively, a duplication region can extend a predetermined distance along the boundary between a first context and an adjacent context. The extent or boundaries of the duplication region can be determined using latitude and longitude data. Named objects located within the duplication region can be identified at 804. Once the named objects within the region have been identified, the named objects can be included in both contexts at 806. In fact, named objects can be included in more than just two contexts. Turning again to the geographical data example, a named object can be in close proximity to multiple contexts, such as where the boundaries of three or more cities or states come together and therefore, can be included in multiple contexts. At 808, a determination is made as to whether there are additional duplication regions to be processed for the context. Each context can have multiple duplication regions based upon the proximity of the context to other contexts. If there are additional duplication regions to process for the context, the process returns to 802 and the next duplication region is determined. If no, the process terminates for the particular context. Each context within the context hierarchy can be processed. In addition, duplication can occur at multiple levels within the context hierarchy.

Figure 9:
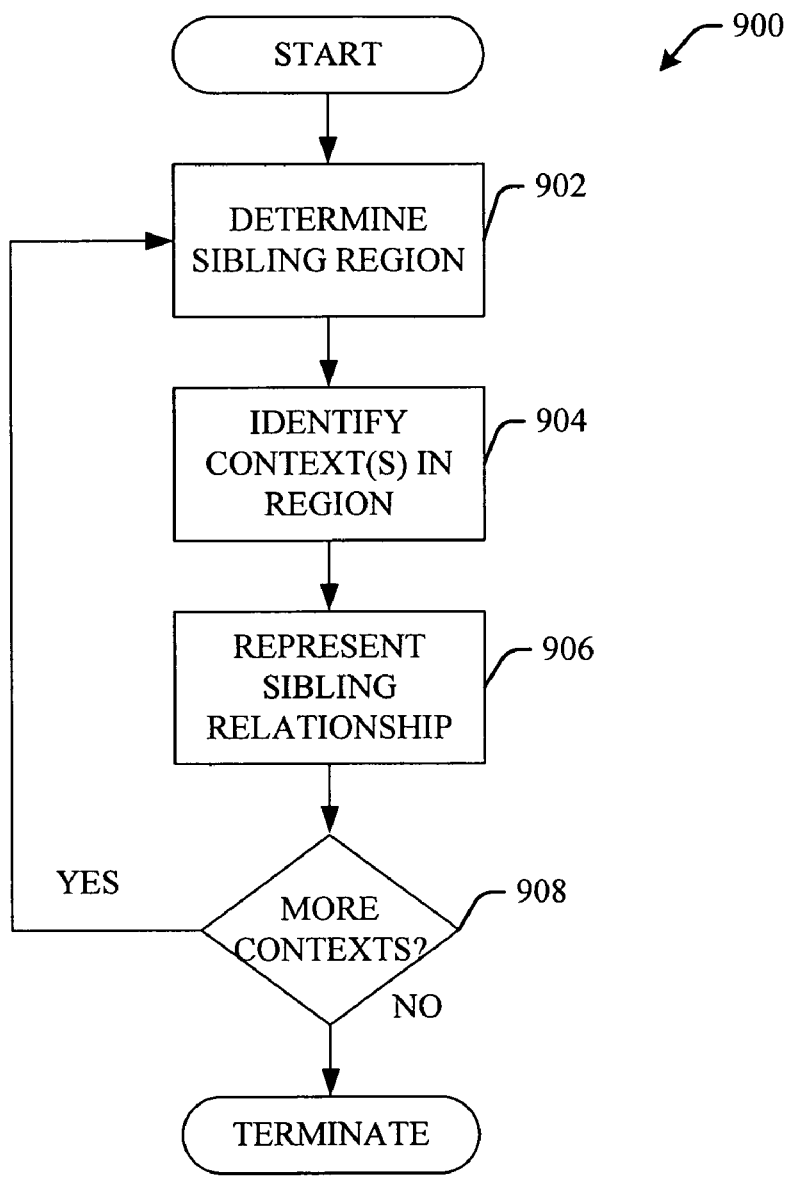
FIG. 9 illustrates a method for representing sibling relationships in accordance with an aspect of the subject matter disclosed herein.

Referring now to FIG. 9, a methodology 900 for including sibling relationships in a context hierarchy is illustrated. A sibling relationship can be based upon a similarity or correlation in contexts that is likely to be useful to users (e.g., spatial proximity). At 902, a sibling region or a threshold for a sibling relationship for a selected context can be determined. The sibling region can be based upon physical proximity between contexts. For example, any context within thirty miles of the boundaries of the selected context can be considered a sibling context of the selected context. The sibling region or threshold establishes the limitations that determine whether a context can be a sibling context of the selected context. At 904, contexts that fall completely and/or partially within the sibling region are identified. In one aspect, each context that shares the parent of the selected context is analyzed to determine if it is within the sibling region and therefore a sibling of the selected context. However, contexts need not share a parent in order to have a sibling relationship. Once the sibling contexts, if any, of the selected context are identified, the sibling contexts are indicated in the context hierarchy at 906. For example, each context can include a list of sibling contexts. At 908, a determination is made as to whether there are additional contexts to process. If yes, the process returns to 902 and the sibling region for the next context is determined. If no, the process terminates.

Figure 10:
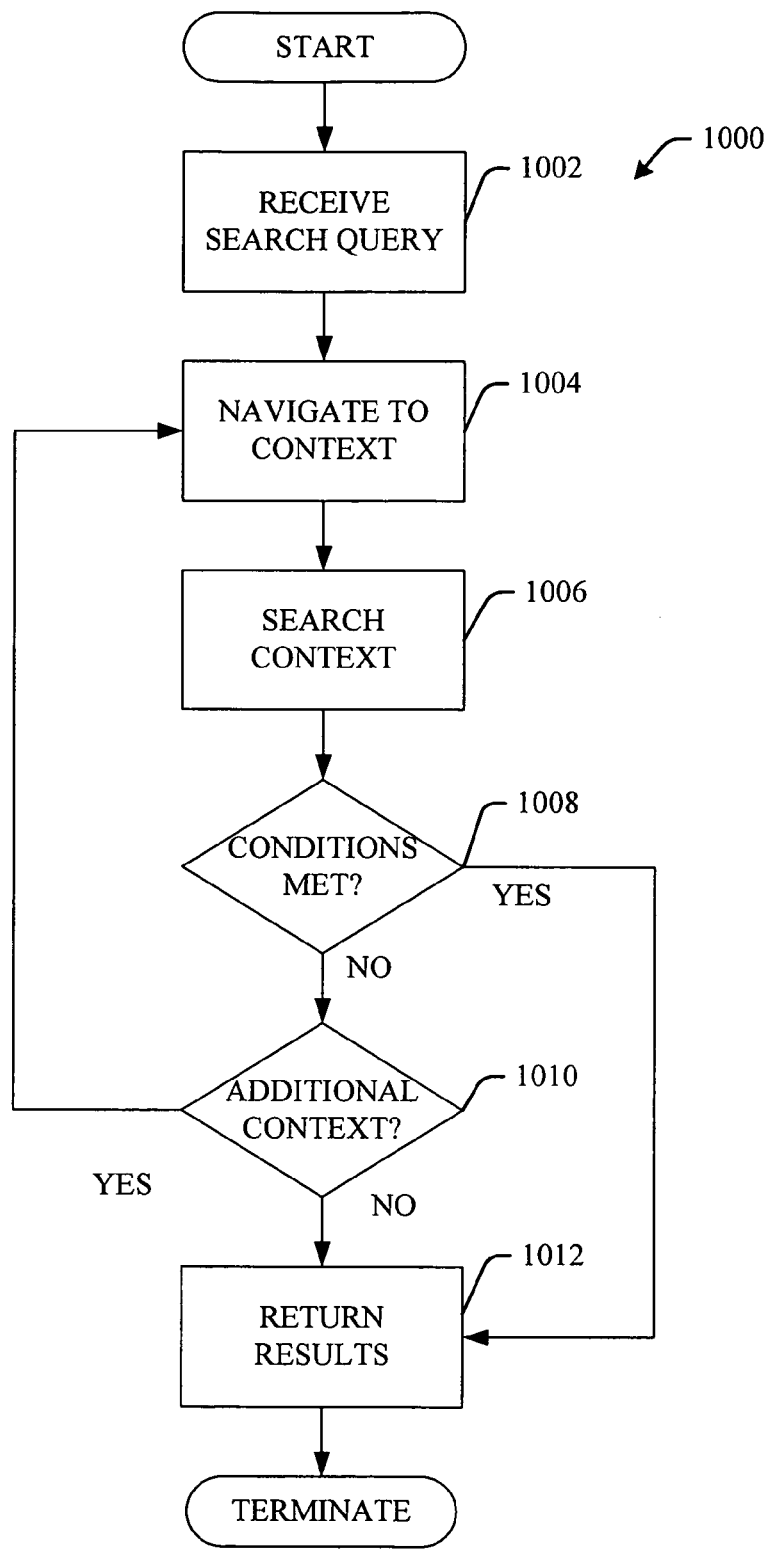
FIG. 10 illustrates a method for retrieving data from a context hierarchy in response to a query in accordance with an aspect of the subject matter disclosed herein.

Referring now to FIG. 10, a methodology 1000 for retrieving data from a context hierarchy based upon a search query is illustrated. At 1002, a search query is received. The search query can include search terms, a start context indicating at which context to begin the search, a navigation strategy and search termination conditions. At 1004, the search begins by navigating to the start context specified in the search query. If no start context is specified in the search query, the root node of the context hierarchy can be used as the default start context. The context can be searched using the search terms at 1006. The context can be searched based upon the name, characteristics or other metadata associated with a named object. At 1008, it is determined whether the termination conditions, if any, of the search have been met. If the termination conditions are met, the search results are returned at 1012 and the search terminates. However, if the termination conditions are not met, it is determined whether there are additional contexts to search at 1010. If yes, the process navigates to the next context based upon the navigation strategy specified in the search query at 1004. If no, the process returns the results at 1012 and terminates.

Figure 11:
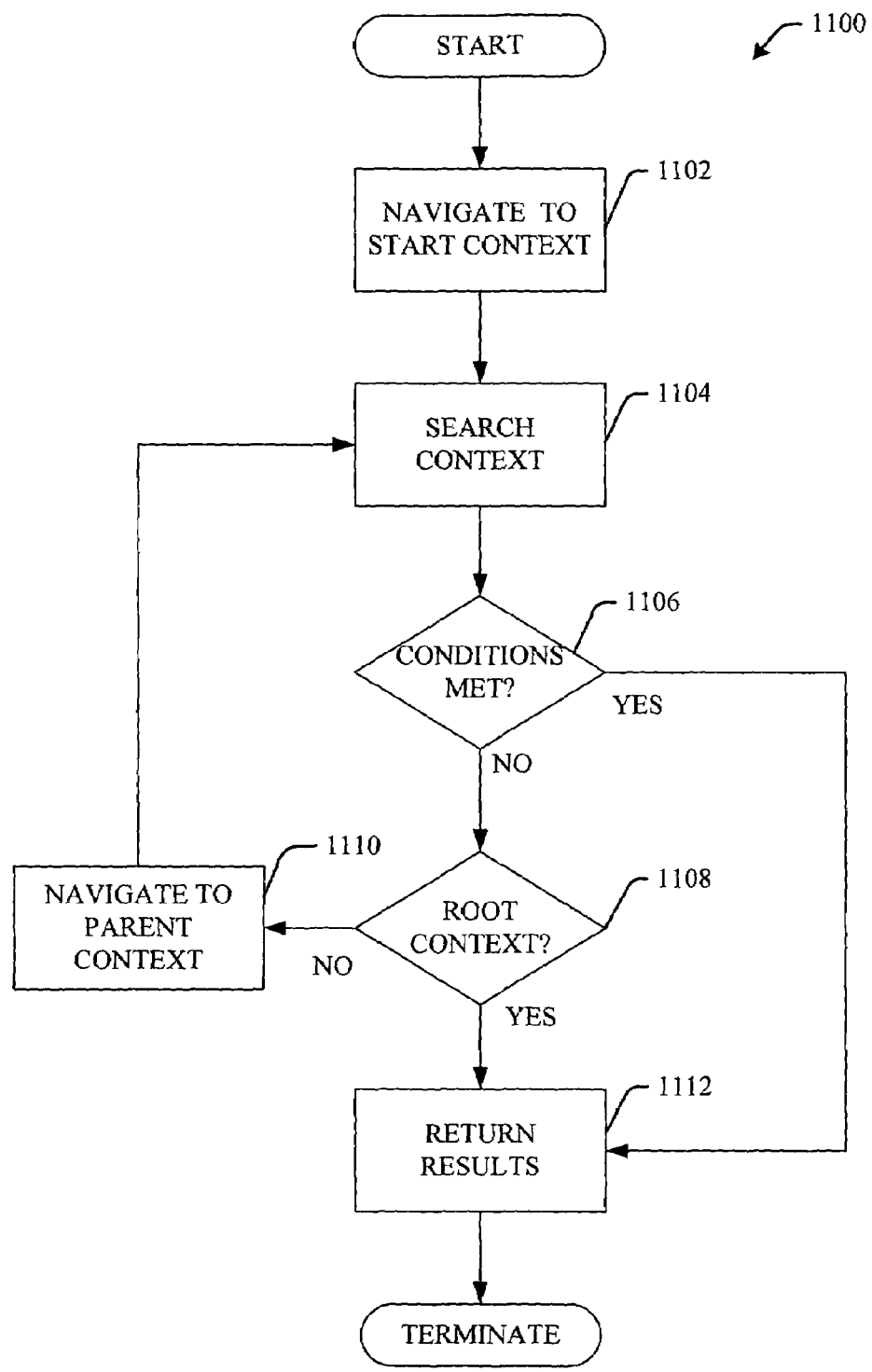
FIG. 11 illustrates a method for searching a context hierarchy using an ascending navigation strategy in accordance with an aspect of the subject matter disclosed herein.

Referring now to FIG. 11, methodology 1100 for searching a context hierarchy using an ascending navigation strategy is illustrated. At 1102, a search of the context hierarchy begins by navigating to the start context specified in the search query or possibly to a default context if the search query fails to specify a start context. The start context is searched based upon the search terms of the search query at 1104. At 1106, a determination is made as to whether the termination conditions, if any, have been met. If the termination conditions are met, the search results are returned at 1112 and the process terminates. If the termination conditions are not met, a determination is made as to whether the current context is the root of the context hierarchy at 1108. If yes, the search results, if any, are returned at 1112 and the process terminates. If no, the search navigates to the parent of the current context at 1110. The process continues by searching the parent context at 1104. In this manner, the search can navigate through ancestors of the start context.

Figure 12:
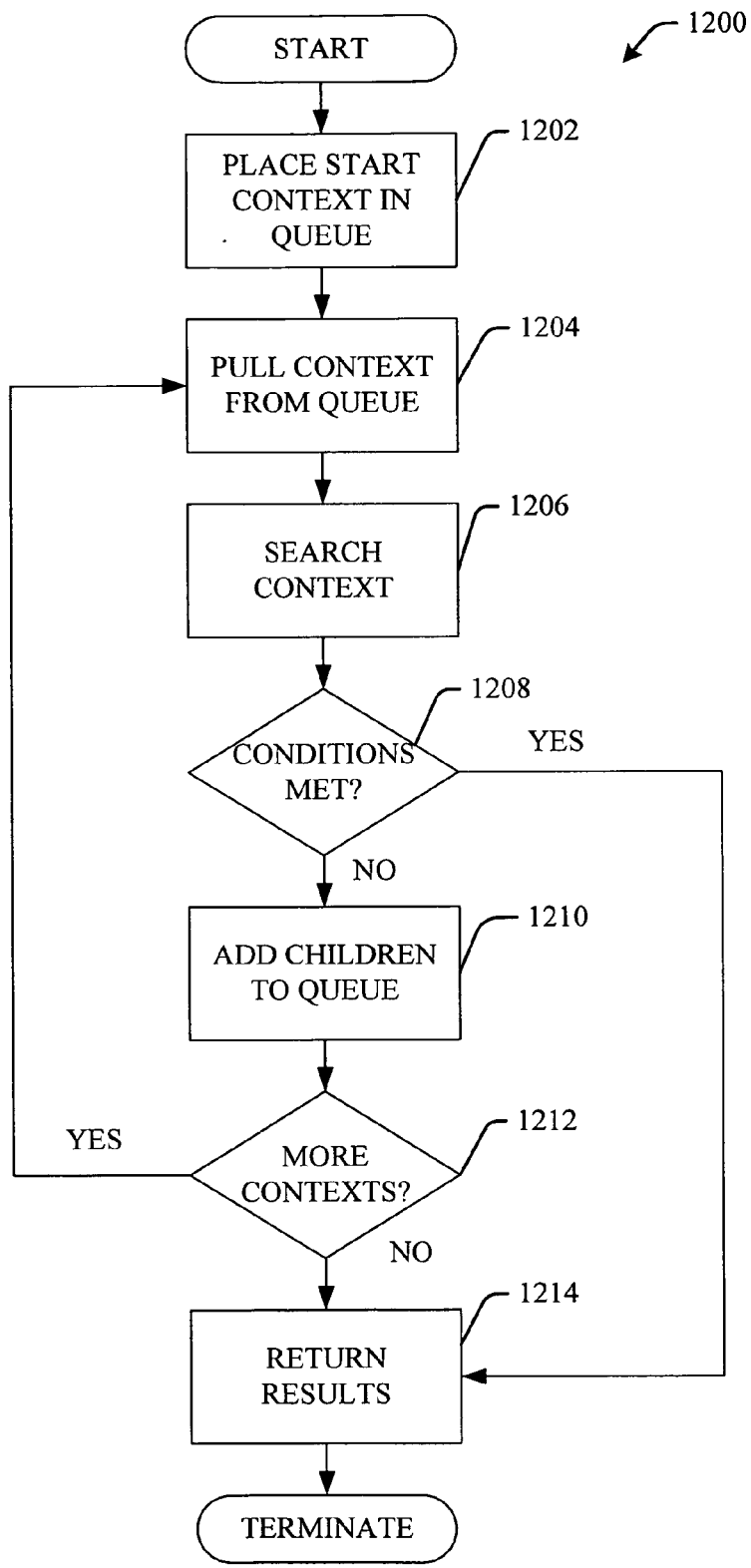
FIG. 12 illustrates a method for searching a context hierarchy using a descending navigation strategy in accordance with an aspect of the subject matter disclosed herein.

Referring now to FIG. 12, a methodology 1200 for searching a context hierarchy using a descending navigation strategy is illustrated. FIG. 12 illustrates a breadth-first search of a context hierarchy. However, there are numerous, well-known algorithms for traversing context hierarchies and in particular, tree hierarchies. Additional search algorithms can include, but are not limited to, depth-first search, best-first search and uniform-cost search. The methodology 1200 uses a queue of contexts during traversal of the context hierarchy. The queue can contain a list of contexts in the order in which the contexts are to be searched. At 1202, the start context, which can be specified in the search query, is added to the queue. At 1204, the context at the beginning of the queue is removed from the queue. The context removed from the queue is then searched based upon the search terms specified in the search query at 1206. At 1208, a determination is made as to whether the termination conditions, if any, have been met. If the termination conditions are met, the search results are returned at 1214 and the process terminates. If the termination conditions are not met, the children of the current context, if any, are added to the end of the queue at 1210. At 1212, a determination is made as to whether there are additional contexts in the queue. If yes, the next context is pulled from the queue at 1204 and the search process continues. If no, the search results are returned at 1214 and the process terminates.

Figure 13:
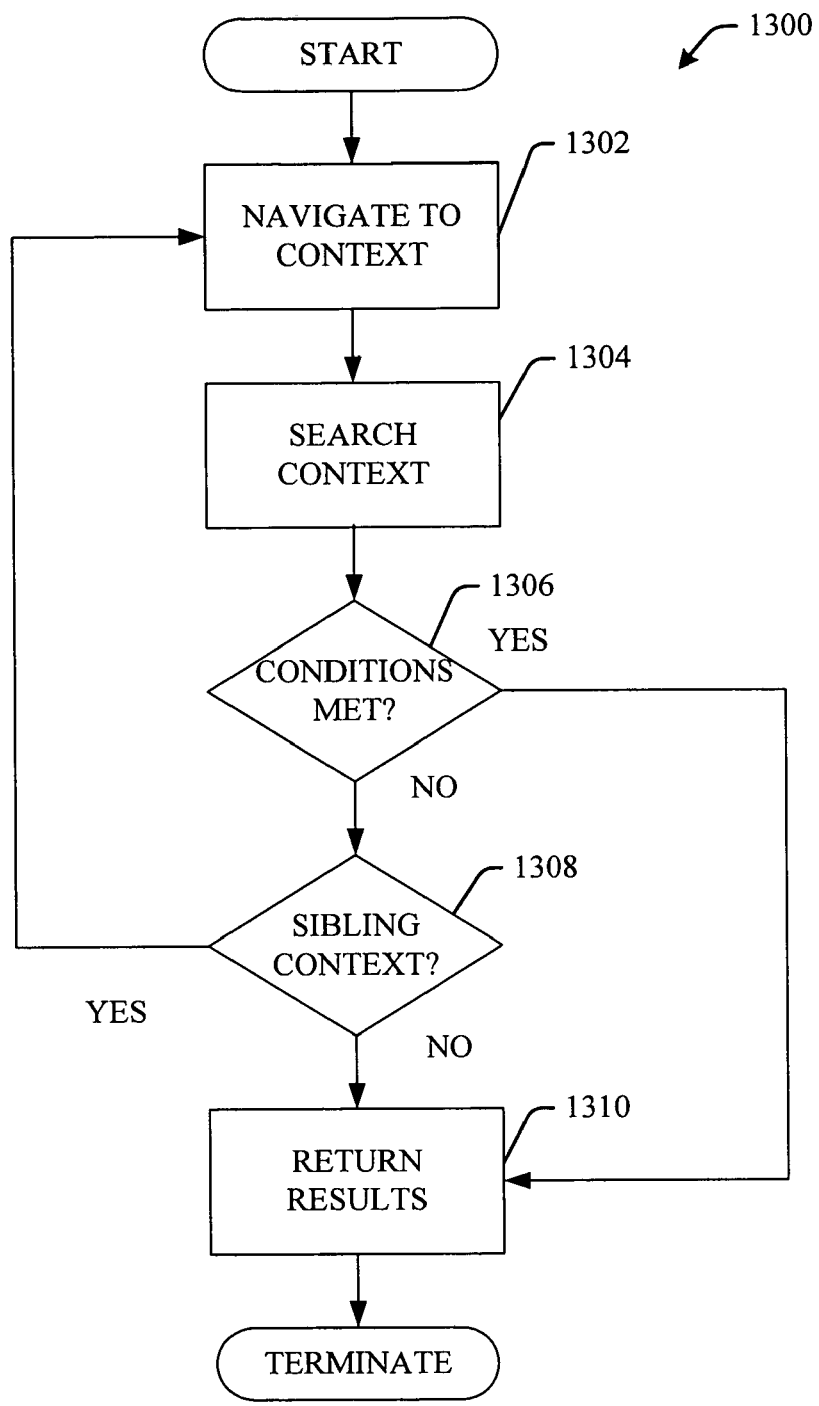
FIG. 13 illustrates a method for searching a context hierarchy using a sibling navigation strategy in accordance with an aspect of the subject matter disclosed herein.

Referring now to FIG. 13, a methodology 1300 for searching a context hierarchy using sibling navigation is illustrated. At 1302, a search of the context hierarchy begins by navigating to the start context, which can be specified in the search query. The context is searched based upon the search terms specified in the search query at 1304. At 1306, a determination is made as to whether the termination conditions, if any, have been met. If yes, the search results are returned at 1310 and the process terminates. If no, a determination is made as to whether the start context has a sibling context that has not yet been searched at 1308. If no, the search results, if any, are returned at 1310 and the process terminates. If yes, the process returns to 1302 and navigates to the sibling context. In this manner, each sibling of the origination context is searched.

Figure 14:
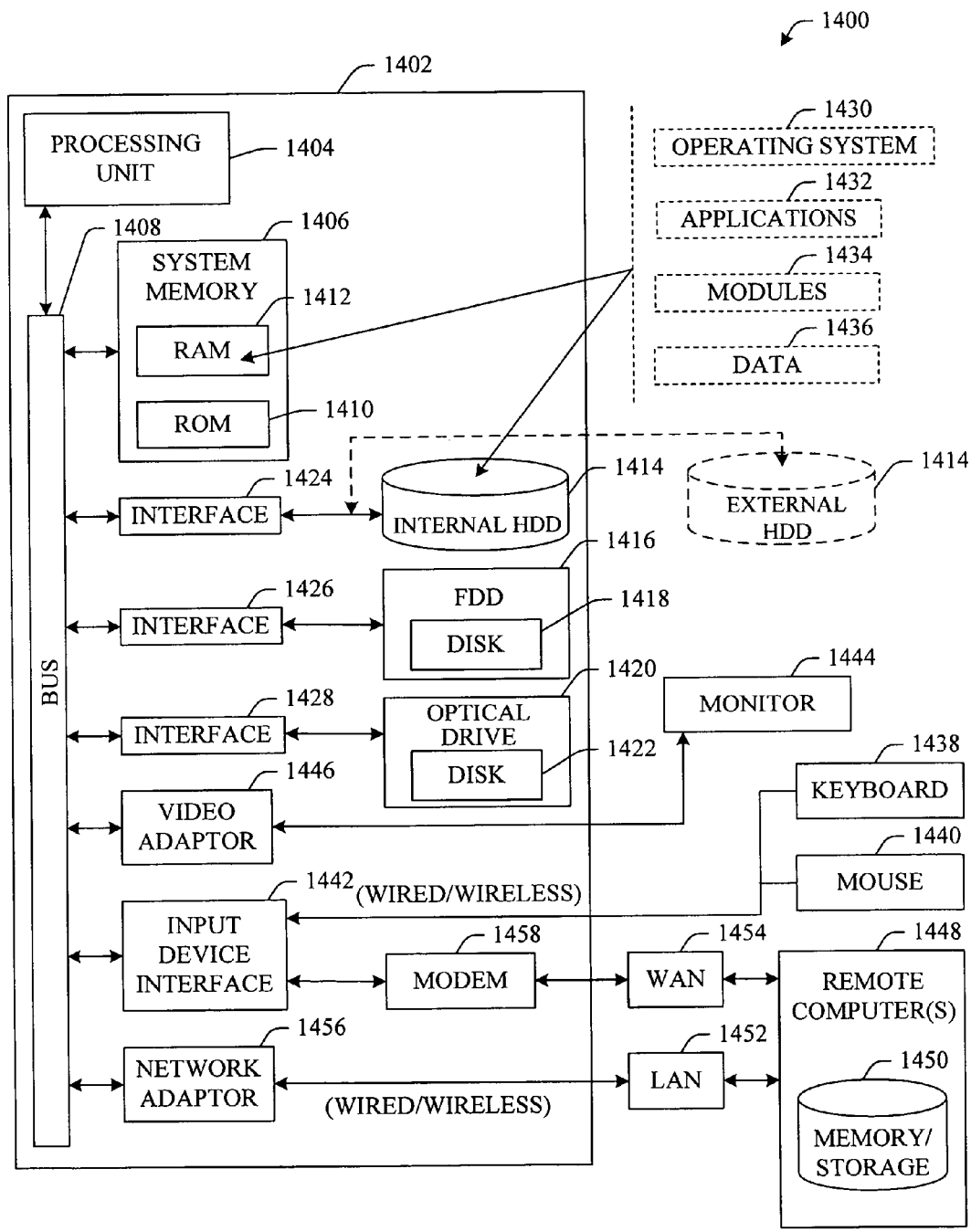
FIG. 14 is a schematic block diagram illustrating a suitable operating environment.
Figure 15:
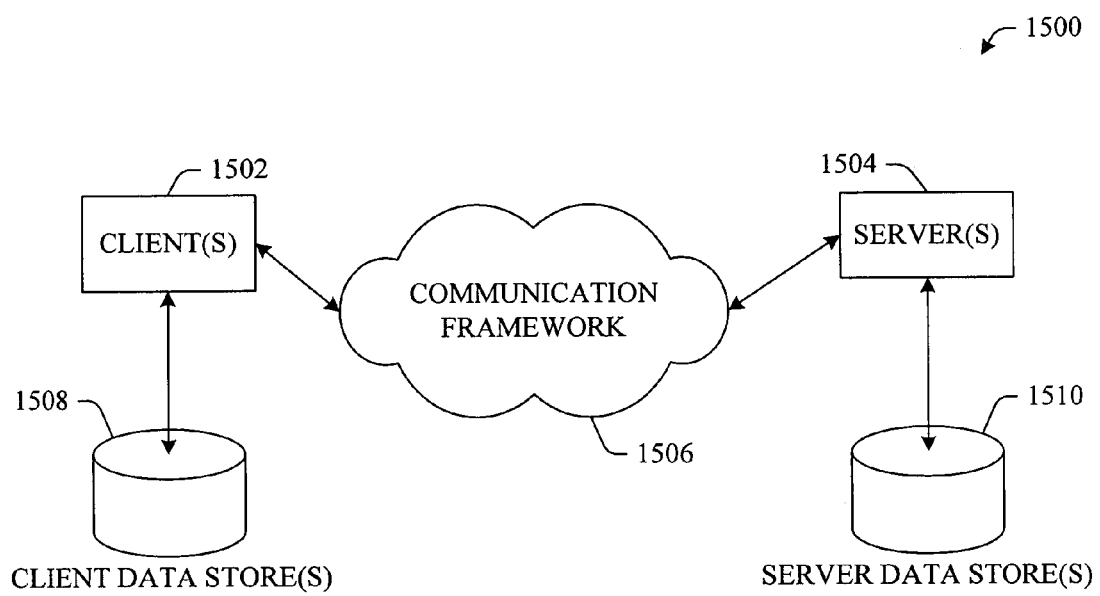
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovations described herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the subject matter described herein can be practiced on stand-alone computers. In a distributed computing environment, program modules may be located in both local and remote memory storage devices.

With reference again to FIG. 14, the exemplary environment 1400 for implementing various aspects of the embodiments includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject systems and methods.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the systems and methods can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 15 is a schematic block diagram of a sample-computing environment 1500 with which the systems and methods described herein can interact. The system 1500 includes one or more client(s) 1502. The client(s) 1502 can be hardware and/or software (e.g., threads, processes, computing devices).

The system 1500 also includes one or more server(s) 1504. Thus, system 1500 can correspond to a two-tier client server model or a multi-tier model (e.g., client, middle tier server, data server), amongst other models. The server(s) 1504 can also be hardware and/or software (e.g., threads, processes, computing devices). One possible communication between a client 1502 and a server 1504 may be in the form of a data packet adapted to be transmitted between two or more computer processes. The system 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system comprising computer-executable instructions embodied on a computer-readable storage medium that when executed on one or more processors facilitates retrieval of data from a context hierarchy, comprising:
   a context search component that accesses a hierarchical data store, the hierarchical data store comprising a plurality of data items, each data item categorized under one or more relevant contexts selected from a plurality of contexts, the plurality of contexts organized in a context hierarchy such that each of the plurality of contexts includes at least one link to another contexts in a parent-child relationship;
   a query component that receives a search query identifying a search term to be located in a hierarchical data store, a starting context within the hierarchical data store, and a navigation strategy for navigating the context hierarchy of contexts when searching for data items matching the identified search term;
   a navigation component that traverses the context hierarchy according to the identified navigation strategy beginning at the identified starting context in order to locate and retrieve at least one data object matching the identified search term; and
   a user interface that facilitates selection of the navigation strategy from a list of possible navigation strategies that includes at least an ascending navigation strategy, a descending navigation strategy, and a sibling navigation strategy.

2. The system of claim 1, wherein selection of the ascending navigation strategy causes the navigation component to traverse upward through the context hierarchy starting at the identified starting context in search of data items matching the identified search term.

3. The system of claim 1, wherein selection of the descending navigation strategy causes the navigation component to traverse downward through the context hierarchy starting at the identified starting context in search of data items matching the identified search term.

4. The system of claim 1, the search query further identifies at least one termination condition, wherein the navigation component terminates the traversal of the context hierarchy when the at least one termination condition is satisfied.

5. The system of claim 1, wherein selection of the sibling navigation strategy facilitates traversal across contexts having a sibling relationship based on geographic proximity of geographical entities represented by the respective contexts, wherein the sibling relationship is not dependent upon a shared parent node between contexts.

6. The system of claim 1, further comprising:
an output component that formats and returns the at least one retrieved data object matching the identified search term.

7. The system of claim 1, the context hierarchy is implemented as a tree structure.

8. The system of claim 1, wherein the at least one data item matching the identified search term is stored in at least two contexts of the hierarchy of contexts.

9. The system of claim 1, the context hierarchy includes a plurality of geographical objects and the contexts define the spatial relationships among the plurality of geographical objects.

10. A computer-implemented method for locating data within a data store, the method comprising:
accessing a hierarchical data store, the hierarchical data store comprising a plurality of contexts arranged in a hierarchy of contexts of at least two levels, each context storing at least one of a link to another context or a data object, and wherein at least one context of the plurality of contexts stores a link to a sibling context in the hierarchy;
obtaining a query for a data object, the query identifying the data object to be sought within the hierarchical data store, a start context within the hierarchy of contexts at which to start searching for the sought-for data object, and a navigation strategy identifying a direction for searching within the hierarchy of contexts beginning with the start context;
searching the contexts of the hierarchical data store according to the navigation strategy beginning with the start context for the sought-for data object; and
returning the sought-for data object in response to the query upon locating the sought-for data object in the hierarchical data store.

11. The method of claim 10, the hierarchical data store manages geographical data and the plurality of contexts define spatial relationships between geographical objects.

12. The method of claim 10, wherein the sought-for data object is stored in at least two contexts of the plurality of contexts in the hierarchical data store.

13. The method of claim 10, further comprising:
specifying an ascending navigation strategy in the query; and
searching upward through the hierarchical data store for the sought-for data object starting at the start context.

14. The method of claim 10, further comprising:
specifying a descending navigation strategy in the query; and
searching downward through the hierarchical data store for the sought-for data object starting at the start context.

15. The method of claim 10, further comprising:
specifying a sibling navigation strategy in the query; and
searching for the sought-for data object within contexts having a sibling relationship with the start context, the sibling relationship determined according to relationships between contexts that are not dependent upon hierarchical parent-child relationships.

16. The method of claim 10, further comprising:
identifying at least one termination condition in the query; and
terminating the search when the at least one termination condition is satisfied.

17. The method of claim 16, the at least one termination condition includes at least one of a maximum number of matching data objects to be located or a maximum period of time for searching the hierarchical data store.

18. A system comprising computer-executable instructions embodied on a computer-readable storage medium that when executed on one or more processors provides efficient storage and access of geographic data, comprising:
means to obtain a query from a user, the query identifying a geographic feature to be located, a starting context for locating a data object in a data store corresponding to the geographic feature, and a navigation strategy for navigating a hierarchical data store;
means to access the hierarchical data store, the hierarchical data store comprising a plurality of contexts arranged in a hierarchy of contexts of at least two levels, each context storing at least one of a link to another context or a data object corresponding to a geographic feature, wherein each context corresponds to a geographic aspect pertaining to each geographic feature represented by a data object in the context and to all child contexts of the respective context, and wherein at least one context of the plurality of contexts links to a sibling context in the hierarchy;
means to search the contexts of the hierarchical data store for the identified geographic feature of the query according to the navigation strategy specified in the query beginning at the starting context identified in the query; and
means to return at least one data object corresponding to the identified geographic feature in response to the query upon locating the identified geographic feature in the at least one data object of a context in the hierarchical data store.

19. The system of claim 18, means to search the contexts of the hierarchical data store further comprises:
means to search upward through the hierarchy of contexts for the identified geographic feature starting at the starting context when the navigation strategy is identified as an ascending strategy; and
means to search downward through the hierarchy of contexts for the identified geographic feature starting at the starting context when the navigation strategy is identified as a descending strategy.

20. The system of claim 18, means to search the contexts of the hierarchical data store further comprises:
means to search for the identified geographic feature within contexts having a sibling relationship with the starting context when the navigation strategy is identified as a sibling navigation strategy, wherein sibling relationships between contexts are determined based at least on a geographic proximity between geographical features represented by the contexts.

* * * * *